(12) United States Patent
Long

(10) Patent No.: US 9,254,574 B2
(45) Date of Patent: Feb. 9, 2016

(54) ROBOT ARM ASSEMBLY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Bo Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 228 days.

(21) Appl. No.: 13/974,391

(22) Filed: Aug. 23, 2013

(65) Prior Publication Data

US 2014/0076089 A1    Mar. 20, 2014

(30) Foreign Application Priority Data

Sep. 14, 2012   (CN) .......................... 2012 1 0339797

(51) Int. Cl.
*B25J 17/02* (2006.01)
*B25J 9/10* (2006.01)
*B25J 19/00* (2006.01)

(52) U.S. Cl.
CPC *B25J 17/02* (2013.01); *B25J 9/102* (2013.01); *B25J 17/0291* (2013.01); *B25J 19/0029* (2013.01); *Y10S 901/26* (2013.01); *Y10S 901/43* (2013.01); *Y10T 74/20335* (2015.01)

(58) Field of Classification Search
CPC ........ B25J 9/102; B25J 17/02; B25J 17/0283; B25J 17/0291; B25J 19/0025; B25J 19/0029; Y10S 901/26; Y10S 901/29

USPC ............................ 74/490.01, 490.05, 490.06
See application file for complete search history.

(56) References Cited

U.S. PATENT DOCUMENTS

| | | | | |
|---|---|---|---|---|
| 4,402,234 A | * | 9/1983 | Malarz et al. | 74/417 |
| 4,690,012 A | * | 9/1987 | Dahlquist et al. | 74/490.06 |
| 4,703,668 A | * | 11/1987 | Peter | 74/490.06 |
| 4,708,580 A | * | 11/1987 | Akeel | 414/735 |
| 5,887,800 A | * | 3/1999 | McClosky | 239/587.1 |
| 6,014,909 A | * | 1/2000 | Fiora | 74/490.02 |
| 6,415,678 B1 | * | 7/2002 | Nada | 74/490.06 |
| 7,870,807 B2 | * | 1/2011 | Hezel et al. | 74/490.06 |
| 8,534,153 B2 | * | 9/2013 | Long | B25J 17/02 74/490.01 |
| 2006/0243087 A1 | * | 11/2006 | Krogedal | 74/490.05 |

FOREIGN PATENT DOCUMENTS

JP   2004338071 A   12/2004
TW   201226130 A1   7/2012

* cited by examiner

*Primary Examiner* — William Kelleher
*Assistant Examiner* — Bobby Rushing, Jr.
(74) *Attorney, Agent, or Firm* — Novak Druce Connolly Bove + Quigg LLP

(57) ABSTRACT

A robot arm assembly with tubes or pipes carrying fluids or electrical cables which do not get bent and are relatively straight, and are not disrupted by, the moving parts of the robot arm includes a first robot arm, a second robot arm, a third robot arm, and a flexible carrying tube. The second robot arm includes a first axle base, a first input shaft, a first bevel gear, and a second bevel gear. The flexible tube is inserted into the first bevel gear and the second bevel gear along a first axis, and fixed to the output shaft.

14 Claims, 2 Drawing Sheets

ROBOT ARM ASSEMBLY

BACKGROUND

1. Technical Field

The present disclosure relates to robot arm assemblies, particularly to a robot arm assembly including several robot arms rotatably connected.

2. Description of Related Art

Robots are applied to perform tasks in environments hazardous or difficult for human operators, such as to spray or clean a workpiece, for example. Tubes or cables are provided to transfer liquid for spraying or cleaning in robots, in spraying or cleaning process. In order to maintain an orderly appearance, the cables are received in a tube which is placed inside the robot and pass through a plurality of arms of the robot. However, because the arms of the robot rotate along different axes, the tubes for receiving the cables are bent following an operation of the robot. The flow of liquid in the cable may be disrupted, which results in a lower spraying efficiency or cleaning efficiency. In addition, action of the arms may abrade or even sever the tube.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
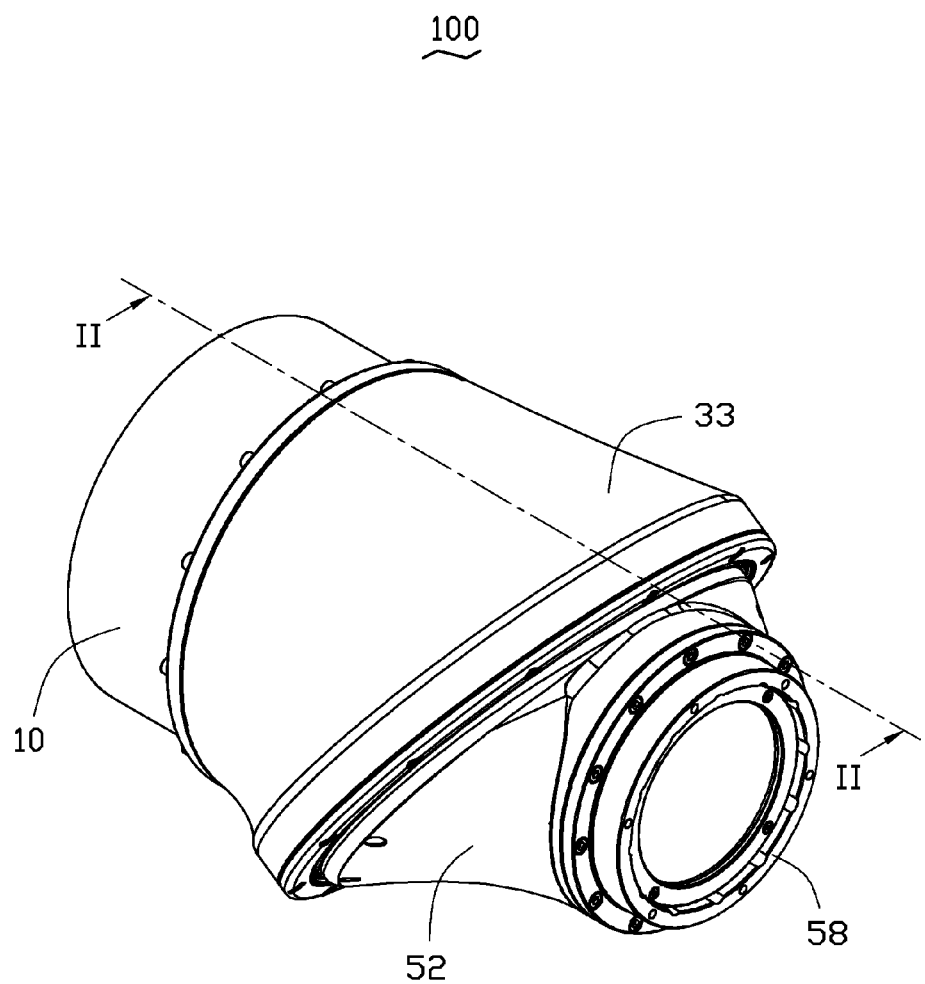
FIG. 1 is an isometric view of an embodiment of a robot arm assembly.
Figure 2:
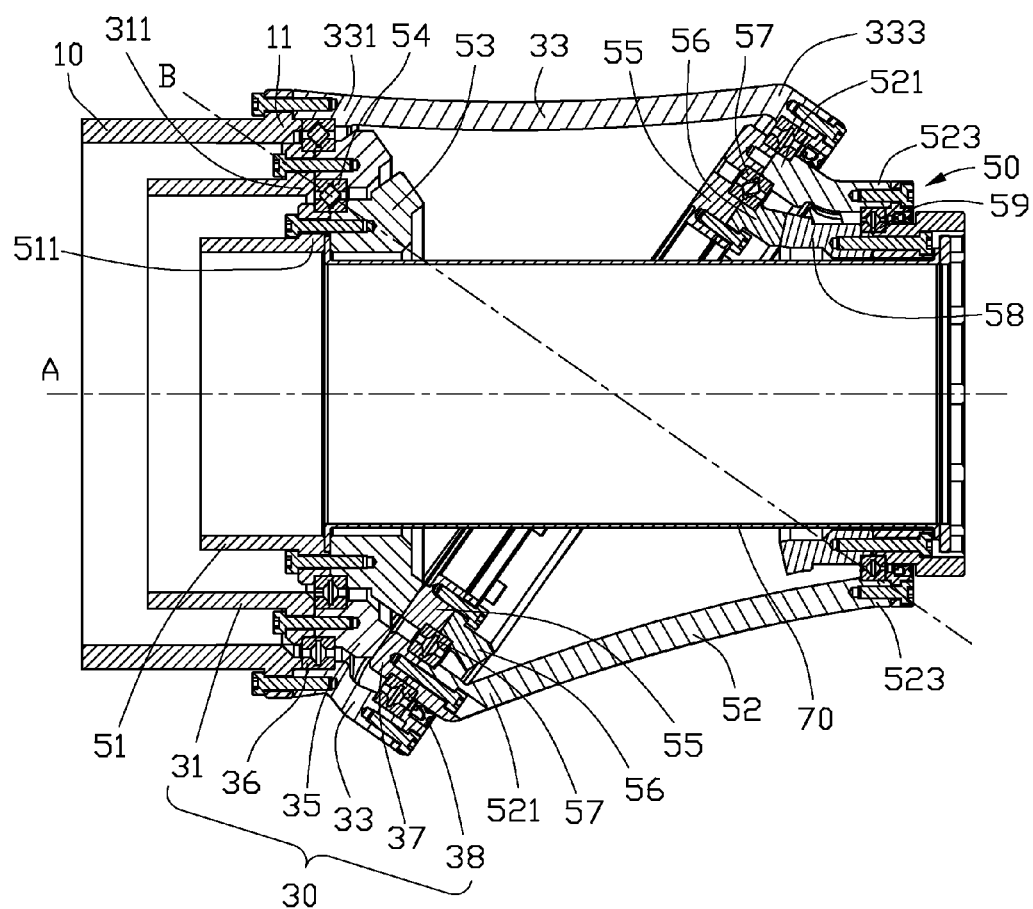
FIG. 2 is a cross-sectional view of the robot arm assembly taken along line II-II shown in FIG. 1.

FIGS. 1 and 2 show one embodiment of a robot arm assembly 100. The robot arm assembly 100 includes a first robot arm 10, a second robot arm 30, a third robot arm 50, and a flexible cable receiving tube 70. The first robot arm 10 is sleeved on the second robot arm 30, and is rotatably connected to the second robot arm 30. The second robot arm 30 is sleeved on the third robot arm 50, and is rotatably connected to the third robot arm 50. The flexible cable receiving tube 70 is inserted into the second robot arm 30 and the third robot arm 50, and an end of the flexible cable receiving tube 70 is connected to an end of the third robot arm 50 away from the first robot arm 10. In the illustrated embodiment, the robot arm assembly 100 is configured for a six-axis robot. The first robot arm 10, the second robot arm 30, and the third robot arm 50 are a fourth robot arm (not shown), a fifth robot arm (not shown), and a sixth robot arm (not shown) of a six-axis robot, respectively.

The first robot arm 10 is substantially cylindrical, and rotates around a first axis A (shown in FIG. 2). The second robot arm 30 includes a first input shaft 31, a first axle base 33, a first bevel gear 35, a first bearing 36, a second bevel gear 37, and a second bearing 38. The first input shaft 31 is substantially cylindrical, and a diameter of the first input shaft 31 is smaller than a diameter of the first robot arm 10. The first input shaft 31 is coaxially received in the first robot arm 10, and the first input shaft 31 rotates around the first axis A. An end 311 of the first input shaft 31 is substantially coplanar with an end 11 of the first robot arm 10.

A shape of the first axle base 33 is substantially configured to be a shape of a cylinder cut along a line intersecting with an axis of the cylinder, and thus a longitudinal sectional view of the first axle base 33 is substantially triangular. The first axle base 33 includes a first opening end 331, and a second opening end 333 opposite to the first opening end 331. A diameter of the first opening end 331 is substantially equal to a diameter of the end 11 of the first robot arm 10 that is substantially coplanar with the first input shaft 31. A diameter of the second opening end 333 is substantially greater than the diameter of the first opening end 331. An axis of the second opening end 333 is defined as a second axis B. The second axis B is inclined relative to an axis of the first opening end 331. The first opening end 331 is fastened to the end 11 of the first robot arm 10, and thus the axis of the first opening end 331 overlaps with the first axis A. The first axis A is inclined relative to the second axis B.

A diameter of the first bevel gear 35 is substantially equal to a diameter of the first input shaft 31. The first bevel gear 35 is mounted on the first opening end 331 of the first axle base 33, and is fixed to the first input shaft 31 by fasteners, which enables the first input shaft 31 to rotate the first bevel gear 35. The first bearing 36 is sleeved on a connecting portion of the first input shaft 31 and the first bevel gear 35, to avoid a rotation of the first axle base 33 following a rotation of the first bevel gear 35 or a rotation of the first input shaft 31.

The second bevel gear 37 is mounted on the second opening end 333 of the first axle base 33, and is connected to the third robot arm 50, thus the second bevel gear 37 rotates around the second axis B. An end of the second bevel gear 37 adjacent to the first bevel gear 35 meshes with the first bevel gear 35, and thus the first bevel gear 35 rotates the second bevel gear 37. The second bearing 38 is sleeved on the second bevel gear 37, to avoid a rotation of the first axle base 33 following a rotation of the second bevel gear 37.

The third robot arm 50 includes a second input shaft 51, a second axle base 52, a third bevel gear 53, a third bearing 54, a fourth bevel gear 55, a fifth bevel gear 56, a fourth bearing 57, an output shaft 58, and a fifth bearing 59.

The second input shaft 51 is substantially cylindrical, and a diameter of the second input shaft 51 is substantially smaller than that of the first input shaft 31. The second input shaft 51 is coaxially received in the first input shaft 31, thus the second input shaft 51 rotates around the first axis A. An end 511 of the second input shaft 51 is substantially coplanar with the end 311 of the first input shaft 31.

A shape of the second axle base 52 is substantially configured in a shape of a frustum cut along a line intersecting with an axis of the frustum. The second axle base 52 is located at a side of the second input shaft 51 adjacent to the second bevel gear 37, and includes a third opening end 521 and a fourth opening end 523 opposite to the third opening end 521. The third opening end 521 is substantially ring-like, and a diameter of the third opening end 521 is substantially smaller that that of the second opening end 333 of the first axle base 33. The fourth opening end 523 is substantially a ring, and a diameter of the fourth opening end 523 is substantially smaller than that of the third opening end 521. An axis of the third opening end 521 is inclined relative to an axis of the fourth opening end 523. An inclined angle between the axis of the third opening end 521 and the axis of the fourth opening end 523 is substantially equal to an inclined angle between the axis of the first opening end 331 and the axis of the second opening end 333. The third opening end 521 is located opposite to the second opening end 333, and is fastened to the second bevel gear 37. Thus, the axis of the third opening end 521 substantially overlaps the second axis B, and the axis of the fourth opening end 523 substantially overlaps the first axis A.

A diameter of the third bevel gear 53 is substantially equal to a diameter of the second input shaft 51. The third bevel gear 53 is mounted in the first opening end 331 of the first axle base 33, and is fastened to the second input shaft 51, which enables the second input shaft 53 to rotate the third bevel gear 53. The third bearing 54 is sleeved on a connecting portion of the third bevel gear 53 and the second input shaft 51, thus the third bevel gear 53 and the first bevel gear 35 can rotate freely.

The fourth bevel gear 55 is coaxially received in the second bevel gear 37, and an end of the fourth bevel gear 55 located adjacent to the third bevel gear 53 meshes with the third bevel gear 53. The fifth bevel gear 56 is coaxially received in the third opening end 521, and meshes with the fourth bevel gear 55. The fourth bevel gear 55 rotates around the second axis B. The fifth bevel gear 56 rotates around the second axis B. The fourth bearing 57 is sleeved on a connecting portion of the fifth bevel gear 56 and the fourth bevel gear 55, to avoid a rotation of the second axle base 52 and the second bevel gear 37 following a rotation of the fifth bevel gear 56 or a rotation of the fourth bevel gear 55.

The output shaft 58 is substantially cylindrical, mounted in the fourth opening end 523, and is fastened to the fifth bevel gear 56, thus the fifth bevel gear 56 rotates the output shaft 58 around the second axis B. The fifth bearing 59 is mounted between the second axle base 52 and the output shaft 58, to avoid a rotation of the second axle base 52 following a rotation of the output shaft 58.

The flexible cable receiving tube 70 is substantially cylindrical, and is inserted into the third bevel gear 53, the fourth bevel gear 55, the fifth bevel gear 56, and the output shaft 58. An end of the flexible cable receiving tube 70 communicates with the second input shaft 51, and the other end of the flexible cable receiving tube 70 is fixed on the output shaft 58, to receive cables carrying electrical power or liquids. The flexible cable receiving tube 70 is positioned along the first axis A, and rotates around the first axis A.

In assembly, the third bevel gear 53 is fixed on the second input shaft 51, and the third bearing 54 is sleeved on a connecting portion of the third bevel gear 53 and the second input shaft 51. The first input shaft 31 is sleeved on the second input shaft 51. The first bevel gear 35 is sleeved on the third bearing 54, and is fixed to the first input shaft 31. The first bearing 36 is sleeved on the first bevel gear 35. The first robot arm 10 is sleeved on the first input shaft 31. The first axle base 33 is sleeved on the first bearing 36, and is fixed to the first opening end 331. The fourth bevel gear 55 is mounted on the second opening end 333, and meshes with the third bevel gear 53. The fifth bevel gear 56 is mounted on the second opening end 333, and meshes with the fourth bevel gear 55. The output shaft 58 is fixed to the fifth bevel gear 56. The fifth bearing 59 is sleeved on the output shaft 58. The fourth bearing 57 is sleeved on a meshing portion of the fifth bevel gear 56 and the fourth bevel gear 55. The second bevel gear 37 is sleeved on the fourth bearing 57. The second axle base 52 is sleeved on the fifth bearing 59, and the second bevel gear 37 is fixed to the third opening end 521. The second bearing 38 is mounted between the second bevel gear 37 and the first axle base 33. The flexible cable receiving tube 70 is inserted into the third bevel gear 53, the fourth bevel gear 55, the fifth bevel gear 56, and the output shaft 58, and is fixed to the output shaft 58.

In use, cables carrying liquids, for example, are inserted into the flexible cable receiving tube 70, and extend to the output shaft 58. The first robot arm 10 rotates around the first axis A, and then drives the first axle base 33 to rotate around the first axis A. The first input shaft 31 rotates around the first axis A, and then the second axle base 52 rotates around the second axis B when driven by the first bevel gear 35 and the second bevel gear 37. The second input shaft 51 rotates around the first axis A, and then the output shaft 58 rotates around the first axis A when driven by the third bevel gear 53, the fourth bevel gear 55, and the fifth bevel gear 56, and thus rotates the flexible cable receiving tube 70 around the first axis A.

In an alternative embodiment, the first robot arm 10, the first input shaft 31, and the second input shaft 51 do not rotate along a same axis, and may rotate along different parallel axes. An axis of the first opening end 331 may be parallel to the first axis A. An axis of the second opening end 333 may be parallel to the second axis B.

It is believed that the present embodiments and their advantages will be understood from the foregoing description, and it will be apparent that various changes may be made thereto without departing from the spirit and scope of the embodiments or sacrificing all of its material advantages.

What is claimed is:
1. A robot arm assembly, comprising:
   a first robot arm;
   a second robot arm comprising:
      a first axle base comprising a first opening end and a second opening end connected to the first opening end, the first opening end fixed to the first robot arm;
      a first input shaft received in the first robot arm;
      a first bevel gear fixed to the first input shaft, and located adjacent to the first opening end; and
      a second bevel gear mounted on the second opening end, and meshing with the first bevel gear;
   a third robot arm comprising:
      a second input shaft rotatable along a first axis, and received in the first input shaft;
      a second axle base fixed to the second bevel gear;
      a third bevel gear fixed to an end of the second input shaft adjacent to the first bevel gear;
      a fourth bevel gear inserted into the second bevel gear and meshing with the third bevel gear; and
      a fifth bevel gear positioned in the second axle base and meshing with the fourth bevel gear; and
      an output shaft inserted into the second axle base, and an axis of the output shaft overlapped with the first axis, the output shaft coaxially positioned at an end of the fifth bevel gear away from the fourth bevel gear; and
   a flexible cable receiving tube inserted into the first bevel gear, the second bevel gear, the third bevel gear, the fourth bevel gear, and the fifth bevel gear along the first axis, and an end of the flexible cable receiving tube arranged away from the second input shaft fixed to the output shaft,
   wherein the second bevel gear is rotatable around a second axis inclined relative to the first axis, the first input shaft is capable of rotating the first bevel gear, and then driving the second bevel gear and the second axle base to rotate around the second axis, the second input shaft is capable of rotating the output shaft around the first axis, and then driving the flexible cable receiving tube to rotate around the first axis, the fourth bevel gear rotates around the second axis, the fifth bevel gear rotates around the second axis.

2. The robot arm assembly of claim 1, wherein an axis of the first opening end is overlapped with the first axis, and an axis of the second opening end is overlapped with the second axis.

3. The robot arm assembly of claim 1, wherein the first robot arm, the first input shaft, and the second input shaft is coaxially arranged, and the first bevel gear and the first input shaft is coaxially arranged.

4. The robot arm assembly of claim 1, wherein the second axle base comprises a third opening end opposite to the first opening end, and a fourth opening end connected to the third opening end, the third opening end is fixed to the second bevel gear, an axis of the third bevel gear is overlapped with the first axis, an axis of the fourth bevel gear is overlapped with the second axis.

5. The robot arm assembly of claim 4, wherein the second robot arm further comprises a first bearing and a second bearing, the first bearing is mounted between the first bevel gear and the first opening end, and the second bearing is mounted between the second bevel gear and the second opening end.

6. The robot arm assembly of claim 4, wherein the third robot arm further comprises a third bearing, a fourth bearing, and a fifth bearing, the third bearing is sleeved on a connecting portion of the second input shaft and the third bevel gear, the fourth bearing is sleeved on the fourth bevel gear and the fifth bevel gear, and the fifth bearing is sleeved on the second axle base and the output shaft.

7. A robot arm assembly, comprising two robot arms;
one of the two robot arms comprising:
a first axle base comprising a first opening end and a second opening end connected to the first opening end;
a first input shaft;
a first bevel gear fixed to the first input shaft, and received in the first opening end;
a second bevel gear received in the second opening end, and meshing with the first bevel gear; and
the other one of the two robot arms comprising:
a second input shaft rotatable along a first axis, and received in the first input shaft;
a second axle base fixed to the second bevel gear;
a third bevel gear fixed to an end of the second input shaft adjacent to the first bevel gear;
a fourth bevel gear inserted into the second bevel gear and meshing with the third bevel gear; and
a fifth bevel gear positioned in the second axle base and meshing with the fourth bevel gear; and
an output shaft inserted into the second axle base, an axis of the output shaft overlapped with the first axis, the output shaft coaxially positioned at an end of the fifth bevel gear away from the fourth bevel gear; and
a flexible cable receiving tube inserted into the first bevel gear, the second bevel gear, the third bevel gear, the fourth bevel gear, and the fifth bevel gear along the first axis, and fixed to the output shaft,
wherein the second bevel gear is rotatable around a second axis inclined relative to the first axis, the first input shaft is capable of rotating the first bevel gear, and then driving the second bevel gear and the second axle base to rotate around the second axis, the second input shaft is capable of rotating the output shaft around the first axis, and then driving the flexible cable receiving tube to rotate around the first axis, the fourth bevel gear is rotatable around the second axis, the fifth bevel gear is rotatable around the second axis.

8. The robot arm assembly of claim 7, wherein an axis of the first opening end is overlapped with the first axis, and an axis of the second opening end is overlapped with the second axis.

9. The robot arm assembly of claim 7, wherein the first input shaft and the second input shaft is coaxially arranged, and the first bevel gear and the first input shaft is coaxially arranged.

10. The robot arm assembly of claim 7, wherein the second axle base comprises a third opening end opposite to the first opening end, and a fourth opening end connected to the third opening end, the third opening end is fixed to the second bevel gear, an axis of the third bevel gear is overlapped with the first axis, an axis of the fourth bevel gear is overlapped with the second axis.

11. The robot arm assembly of claim 10, wherein the one of the two robot arms comprising the first axle base further comprises a first bearing and a second bearing, the first bearing is mounted between the first bevel gear and the first opening end, and the second bearing is mounted between the second bevel gear and the second opening end.

12. The robot arm assembly of claim 10, wherein the other one of the two robot arms comprising the second axle base further comprises a third bearing, a fourth bearing, and a fifth bearing, the third bearing is sleeved on a connecting portion of the second input shaft and the third bevel gear, the fourth bearing is sleeved on the fourth bevel gear and the fifth bevel gear, the fifth bearing is sleeved on the second axle base and the output shaft.

13. The robot arm assembly of claim 10, wherein a shape of the second axle base is substantially in a shape of a frustum cut along a line intersecting with an axis of the frustum.

14. The robot arm assembly of claim 7, wherein a shape of the first axle base is substantially configured in a shape of a cylinder cut along a line intersecting with an axis of the cylinder.

* * * * *